United States Patent [19]

Purcell

[11] 4,159,857

[45] Jul. 3, 1979

[54] TRACK ASSEMBLY WITH MID-PITCH DRIVE LUG AND REPLACEABLE RAIL

[75] Inventor: Robert J. Purcell, Washington, Ill.

[73] Assignee: Caterpillar Tractor Co., Peoria, Ill.

[21] Appl. No.: 910,251

[22] Filed: May 30, 1978

[51] Int. Cl.² .............................................. B62D 55/28
[52] U.S. Cl. ........................................ 305/54; 305/56; 305/57
[58] Field of Search ................ 305/54, 56, 57; 74/247

[56] References Cited

U.S. PATENT DOCUMENTS

| | | | |
|---|---|---|---|
| 1,186,785 | 6/1916 | Holt | 305/57 |
| 3,237,999 | 3/1966 | Pentecost | 305/57 |
| 3,477,769 | 11/1969 | Thompson | 305/57 |
| 3,567,294 | 3/1971 | Simpson et al. | 305/57 |
| 3,815,962 | 6/1974 | Stedman et al. | 305/57 |
| 3,947,074 | 3/1976 | Nelson | 305/57 |
| 3,948,573 | 4/1976 | Baylor | 305/57 |
| 4,050,750 | 9/1977 | Yoshihashi et al. | 305/54 |
| 4,098,543 | 7/1978 | Sturges | 305/54 |

Primary Examiner—John P. Shannon
Attorney, Agent, or Firm—Frank L. Hart

[57] ABSTRACT

A track assembly comprises a pair of laterally spaced links releasably secured to each track shoe thereof. A drive lug extends between the links and a rail is disposed on each link. A plurality of bolts provide common fasteners for releasably securing the links, track shoe, drive lug and rails together. A pair of such bolts are preferably disposed on each lateral side of each link to increase the lateral stability of the links and overall structure integrity of the track assembly.

12 Claims, 3 Drawing Figures

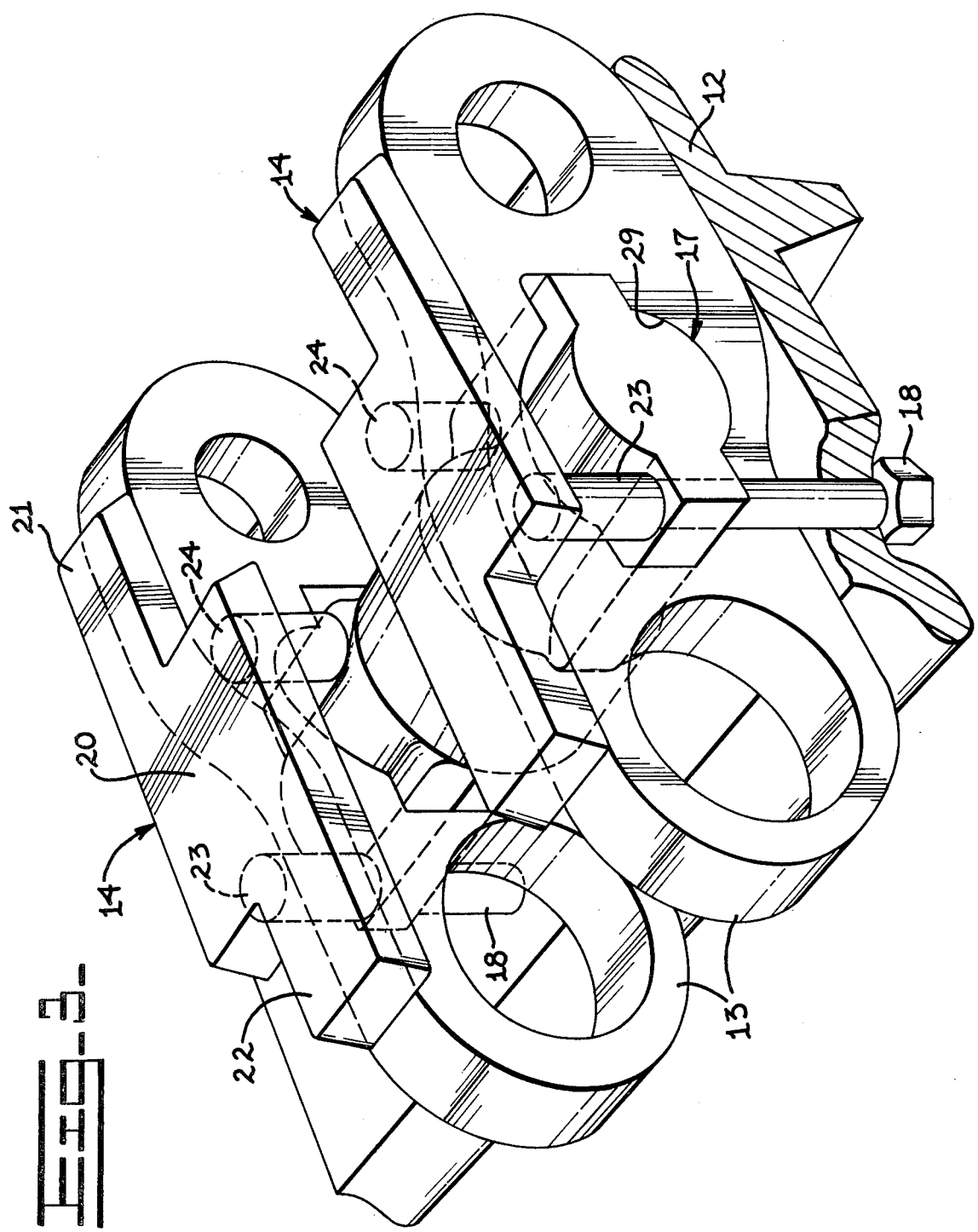

TRACK ASSEMBLY WITH MID-PITCH DRIVE LUG AND REPLACEABLE RAIL

TECHNICAL FIELD

This invention relates to a track assembly adapted for use on a track-type vehicle having mid-pitch drive lugs and replaceable rails releasably secured thereon.

BACKGROUND ART

A conventional track-type vehicle, such as a tractor, is adapted for heavy duty work during various construction and earthmoving operations. Each track assembly thereof comprises a plurality of links pivotally interconnected by pin and bushing assemblies which further function as drive lugs adapted to engage the teeth of a drive sprocket. In order to alleviate stresses imposed on such assemblies, mid-pitch drive lugs have been commonly employed to engage the drive sprocket to thus relieve stresses normally imposed on the pin and bushing assemblies. Mid-pitch drive lugs of this type are disclosed in U.S. Pat. No. 3,567,294, assigned to the assignee of this application.

In addition, conventional track assemblies oftentimes employ a rail segment on each link thereof which is adapted to engage track rollers mounted on the suspension system of the vehicle. The rail segments may be either welded or releasably connected to a respective link for replacement purposes. A disclosure of the latter construction may be found in U.S. Pat. No. 3,947,074, also assigned to the assignee of this application.

A reccurring problem in the design and fabrication of track assemblies of this type is to provide a track assembly exhibiting a high degree of structural integrity and long life expectancy. In addition, such design must also facilitate servicing and repair. For example, the rail segments and/or mid-pitch drive lugs require periodic replacement or reversal. Furthermore, the rail segments and drive lugs are secured to the track assembly independently of each other whereby the complexity and required servicing time of the track assembly are increased in comparison with the track assembly embodying the invention. Also, the bolts utilized to secure the components of a conventional track assembly together normally extend upwardly through bores formed through the links thereof.

DISCLOSURE OF THE INVENTION

The present invention is directed to overcoming one or more of the problems as set forth above.

In one aspect of this invention, the track assembly comprises a pair of laterally spaced links, a track shoe disposed on an underside of each of the links, a rail segment disposed on an upper side of each of the links, and a drive lug disposed intermediate the ends of the links and further disposed in transverse relationship relative thereto. Common fastening means releasably secure the track shoe and drive lug to each of the links and to the rail segment disposed thereon. The fastening means comprises a plurality of fasteners each extending sequentially through the track shoe and drive lug and releasably secured to the rail segment to clamp a respective link between the rail segment and track shoe. Thus, upon diassembly for servicing purposes, the components of the structurally integrated track assembly may be released from each other solely upon release of the fastening means.

In another aspect of this invention is the disposition of fasteners comprising the fastening means in straddling relationship on each side of each link of the track assembly to increase the lateral stability thereof.

This invention thus provides a track assembly which exhibits a high degree of structural integrity and long service life while yet providing for the expeditious diassembly thereof for servicing purposes.

BRIEF DESCRIPTION OF THE DRAWINGS

Other objects of this invention will become apparent in the following description and accompanying drawings wherein:

FIG. 3 is a perspective view of one segment of the track assembly.

BEST MODE FOR CARRYING OUT THE INVENTION

Figure 1:
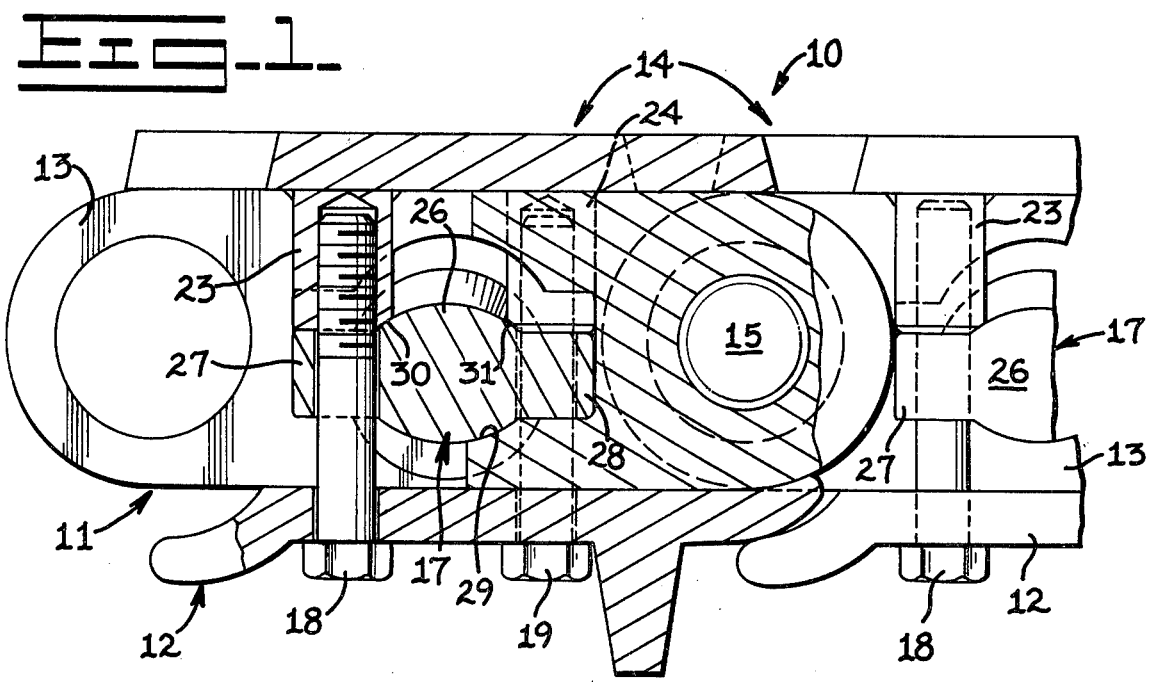
FIG. 1 is a partially sectioned side elevational view of a portion of a track assembly embodying this invention.
Figure 2:
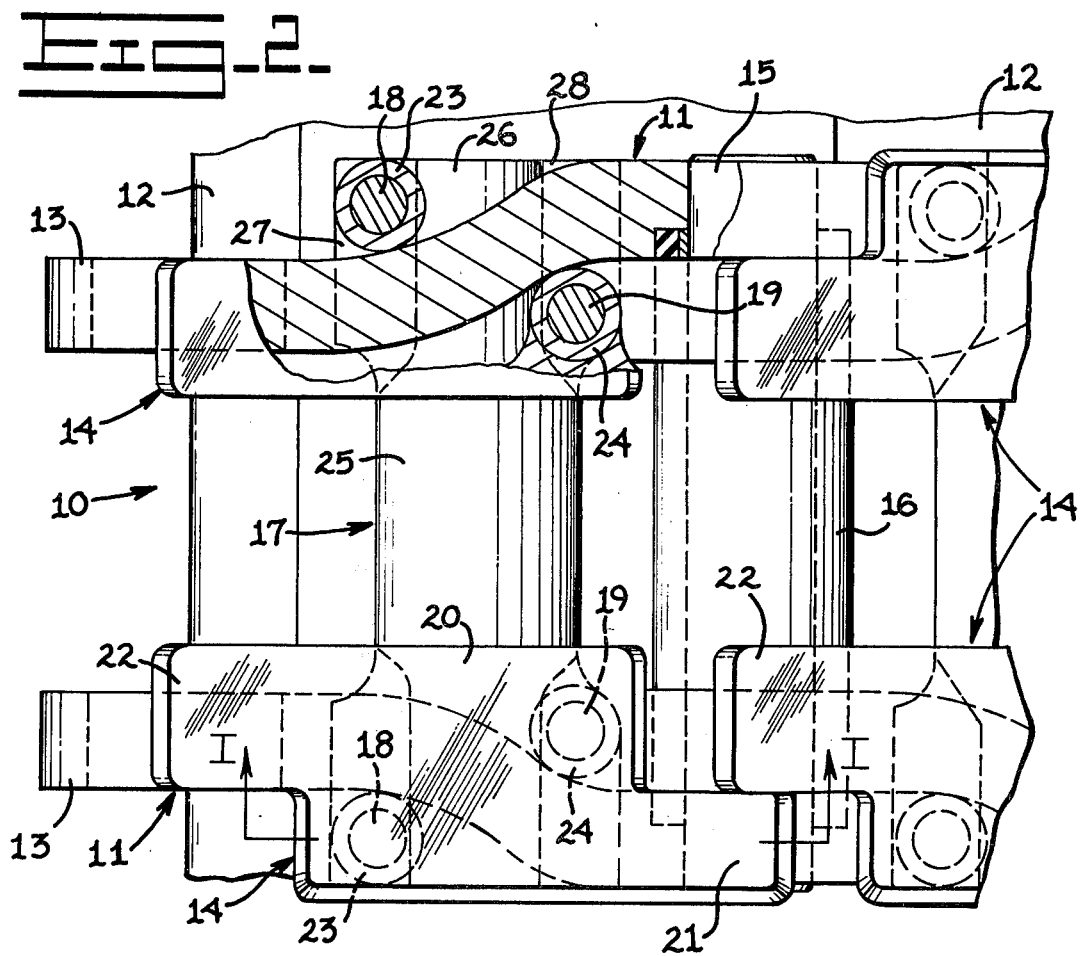
FIG. 2 is a partially sectioned top plan view of the track assembly.

FIGS. 1 and 2 illustrate a portion of a track assembly 10 comprising a pair of laterally spaced link assemblies 11. A track shoe 12 is disposed on an underside of a pair of laterally spaced and generally S-shaped links 13 of the link assemblies and a rail segment 14 is disposed on an upper side of each link. A pin and bushing assembly, comprising a pin 15 secured within bores formed through first ends of one pair of links and a bushing 16 secured within bores formed through second ends of a next adjacent pair of links, functions to pivotally connect the links together in a conventional manner. A drive lug 17 is disposed intermediate the ends of each pair of links and is further disposed in transverse relationship thereto for the purpose of engaging the teeth of a drive sprocket (not shown) in a conventional manner.

One of the novel features of this invention resides in the employment of common fastening means for releasably securing track shoe 12 and drive lug 17 to each of the links and also to a respective rail segment. As more fully discussed hereinafter, this arrangment facilitates expeditious and precise assembly and disassembly for servicing purposes. In the illustrated embodiment, such fastening means comprises a first fastener or bolt 18 disposed on an outboard side of each link 13, and a second fastener or bolt 19 disposed on an inboard side thereof.

Another feature of this invention resides in the diagonal relationship of bolts 18 and 19 in straddling relationship relative to each link 13 whereby the lateral stability of the link is substantially increased over conventional track assemblies wherein corresponding bolts would normally extend upwardly through bores formed in the link. In addition to providing such lateral stability less material is machined out of the link to prevent structural weakening thereof. Thus, each link is firmly clamped between the track shoe and a respective rail segment with a pair of bolts restraining lateral movement of the link.

Each rail segment 14 comprises a main body portion 20, a leading portion 21, and a trailing portion 22 which is offset laterally relative to portion 21, as clearly shown in FIGS. 2 and 3. A pair of bosses 23 and 24 are secured to an underside of each rail segment, such as by welds, and are each threaded internally to receive the threaded shank of a respective bolt. It should be noted that bosses 23 and 24 thus also straddle link 13 to provide substantial bearing surfaces, engaging opposite sides of the link.

Each drive lug 17 comprises a tubular central section 25 adapted to engage the teeth of a drive sprocket (not shown), whereby loads normally imposed on the pin and bushing assemblies are relieved. Each end of the drive lug has an oval-shaped outer section 26, having a pair of flanges 27 and 28 secured on the sides thereof. As shown, the outer section of the lug extends through a like-shaped opening 29 formed through a respective link and bolts 18 and 19 sequentially extend through track shoe 12 and flanges 27 and 28, respectively, and are threadably secured to bosses 23 and 24. Alternatively, the bolts could be suitably arranged to threadably secure the track shoe to the bosses directly without extending through the flanges, e.g., the flanges could be suitably relieved and solely clamped between the track shoe and rail segment. Thus, the bolts do not extend through the links which are clamped in place between the rail segments and drive lug to the track shoe.

The undersides of outer section 26 and the flanges are received within opening 29 to provide substantial bearing surface contact therebetween. It should be further noted that the lower ends of bosses 23 and 24 engage the upper sides of the flanges in bearing surface contact therewith whereby the drive lug is firmly clamped in place by the bolts. Chamfers 30 and 31 are formed on the lower ends of bosses 23 and 24, respectively, to accommodate the oval-shaped end portion of the drive lug, as more clearly shown in FIG. 1.

Industrial Applicability

In operation, drive lugs 17 of the track assembly will engage between the teeth of the drive sprocket (not shown) whereby impact forces normally imposed on the pin and bushing assemblies are substantially relieved. Bolts 18 and 19 firmly clamp each drive lug in a fixed position within the track assembly, along with track shoe 12 and rail segments 14, to prevent any loosening of the component parts during operation. As discussed above, flanges 27 and 28, formed on each end of the drive lug, are securely clamped between bosses 23 and 24 and a respective track link to aid in this securing function.

Thus, driving forces imparted to the track assembly by the drive sprocket are transmitted directly to links 13 and track shoes 12. Furthermore, the disposition of bolts 18 and 19 and bosses 23 and 24 on opposite sides of each link, further increases the overall structural integrity of the track assembly by providing lateral support to a respective link.

Disassembly of Track Assembly 10 for Repair Purposes

Periodically, rail segments 14 and drive lugs 17 will require replacement or repair. Expeditious disassembly of the rail segments and drive lugs may be achieved by merely removing bolts 18 and 19. Whereas individual rail segments may be replaced or repaired, it should be noted that each drive lug 17 is reversible whereby it may be flopped-over 180° in a lateral direction to expose an unworn portion of the drive lug to the teeth of the drive sprocket. For example, referring in FIG. 2 and assuming that the right side of drive section 25 of the drive lug is normally engaged by teeth of the drive sprocket, it should be noted that the drive lug may be reversed to thus position an unworn portion on the same side of the drive lug into position for contact with the teeth of the drive sprocket.

Installation and removal of the drive lug is easily effected by moving the drive lug transversely through the illustrated openings 29, formed through the track links, whereby complete dismantling of the track assembly is not required for such repair or replacement purposes. It should be further noted that links 13, as well as drive lugs 17, may be suitably formed by stamping operations to further increase the economical aspects of the track assembly of this invention.

What is claimed is:
1. A track assembly comprising:
   a pair of laterally spaced links,
   a track shoe disposed on an underside of said pair of links,
   a rail segment disposed on an upper side of each link of said pair of links,
   a drive lug disposed intermediate the ends of said links and further disposed in transverse relationship relative therebetween, and
   fastening means releasably securing said track shoe and drive lug to each of said links and to the rail segment disposed thereon,
   wherein said fastening means comprises a plurality of fasteners each extending sequentially through said track shoe and said drive lug and releasably secured to said rail segment whereby each said link is clamped between said rail segment and said track shoe.
2. The track assembly of claim 1 wherein a pair of said fasteners are disposed on opposite sides of each of said links in straddling relationship therewith to increase the lateral stability thereof.
3. The track assembly of claim 2 wherein said pair of fasteners are disposed in diagonal relationship to each other.
4. The track assembly of claim 1, 2 or 3 wherein each of said fasteners is threadably secured within a boss secured to an underside of said rail segment.
5. The track assembly of claim 1 wherein said drive lug is clamped in bearing contact between a boss secured to said rail segment and a respective one of said links.
6. The track assembly of claim 1, 2 or 5 wherein said drive lug comprises a central section disposed between said links and a pair of outer sections formed on opposite ends of said central section and extending through openings in said links.
7. The track assembly of claim 6 wherein said drive lug further comprises at least one flange formed on each outer section thereof and wherein a said fastener extends through said flange.
8. The track assembly of claim 7 wherein a pair of said flanges are formed on each outer section of said drive lug.
9. A track assembly comprising:
   a pair of laterally spaced links,
   a track shoe disposed on an underside of said pair of links, and
   fastening means releasably securing said track shoe to each of said links comprising a first fastener disposed on an outboard side of each link and a second fastener disposed on an inboard side of such link and further disposed in diagonal relationship relative to said first fastener whereby said first and second fasteners straddle said link to increase the lateral stability thereof.
10. The track assembly of claim 9 further comprising a rail segment disposed on an upper side of each of said links and wherein each of said first and second fasteners is releasably secured to said rail segment.

11. The track assembly of claim 10 further comprising a pair of bosses secured to an underside of said rail segment and wherein said first and second fasteners are each threadably secured to a respective one of said bosses.

12. The track assembly of claim 11 wherein said bosses are disposed on opposite sides of a respective link in bearing contact therewith.

* * * * *